United States Patent
Nourai et al.

(10) Patent No.: US 6,762,591 B2
(45) Date of Patent: *Jul. 13, 2004

(54) SYSTEM AND METHOD OF FORMING CAPACITOR-BASED ELECTRICAL ENERGY STORAGE MODULES

(75) Inventors: Ali Nourai, Dublin, OH (US); John H. Provanzana, Worthington, OH (US); Raymond M. Hayes, Lancaster, OH (US)

(73) Assignee: AEP EmTech LLP, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/341,126

(22) Filed: Jan. 13, 2003

(65) Prior Publication Data

US 2003/0231007 A1 Dec. 18, 2003

Related U.S. Application Data

(63) Continuation of application No. 10/173,917, filed on Jun. 18, 2002, now Pat. No. 6,518,734.

(51) Int. Cl.$^7$ .................................................. H02J 7/00
(52) U.S. Cl. ........................................................ 320/166
(58) Field of Search ................................ 320/166, 121, 320/116, 120, 126, 167; 307/110; 363/89

(56) References Cited

U.S. PATENT DOCUMENTS

| | | | | |
|---|---|---|---|---|
| 6,137,262 A | * | 10/2000 | Hauer | 320/132 |
| 6,184,656 B1 | * | 2/2001 | Karunasiri et al. | 320/119 |
| 6,215,278 B1 | * | 4/2001 | Okamura et al. | 320/119 |
| 6,323,623 B1 | * | 11/2001 | Someya et al. | 320/166 |
| 6,410,184 B1 | * | 6/2002 | Horiuchi et al. | 429/156 |
| 6,456,986 B1 | * | 9/2002 | Boardman et al. | 705/400 |
| 6,518,734 B1 | * | 2/2003 | Nourai et al. | 320/166 |
| 6,541,941 B2 | * | 4/2003 | Adams et al. | 320/121 |
| 2002/0017822 A1 | * | 2/2002 | Umemura et al. | 307/66 |

* cited by examiner

Primary Examiner—Gregory J. Toatley, Jr.
(74) Attorney, Agent, or Firm—Standley Law Group LLP

(57) ABSTRACT

A system and method for creating capacitor-based electrical energy storage modules and electrical energy storage systems assembled therefrom. Submodules having a plurality of capacitors capable of storing electrical energy are used in different combinations to create electrical energy storage modules. Preferably, a number of submodules are placed into an enclosure or cabinet, whereafter the submodules are placed in electrical communication. The number of submodules installed in an enclosure is determined by the power output desired, and the space constraints of the area in which the enclosure will be located. One enclosure of one or more submodules, or a plurality of interconnected enclosures of one or more submodules, may form an electrical energy storage module. The module may be designed to output either DC or AC electric power, and may be equipped with a power conversion system and/or communication and control electronics to control the charging and discharging thereof.

15 Claims, 12 Drawing Sheets

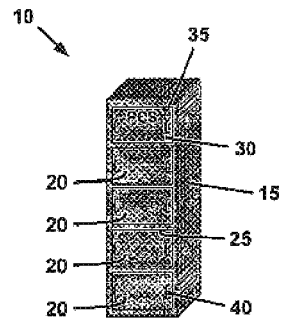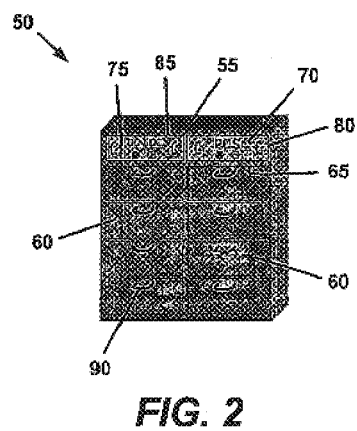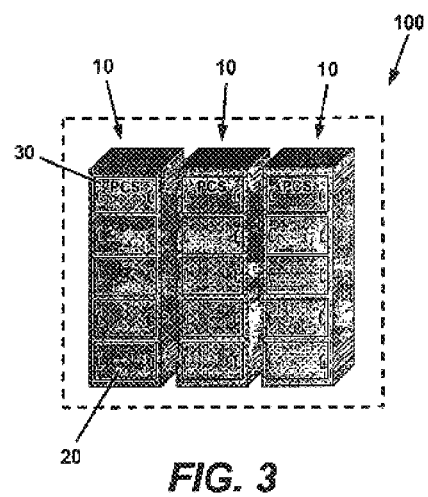
*FIG. 1*   *FIG. 2*   *FIG. 3*

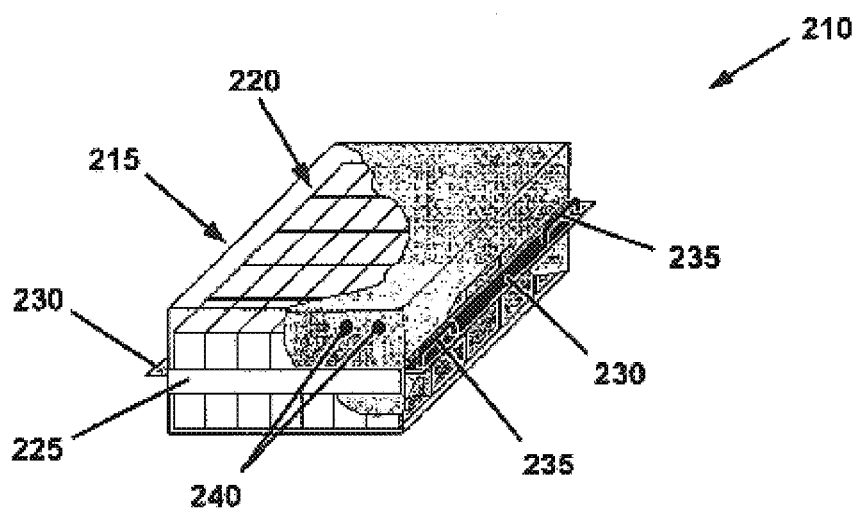
FIG. 10
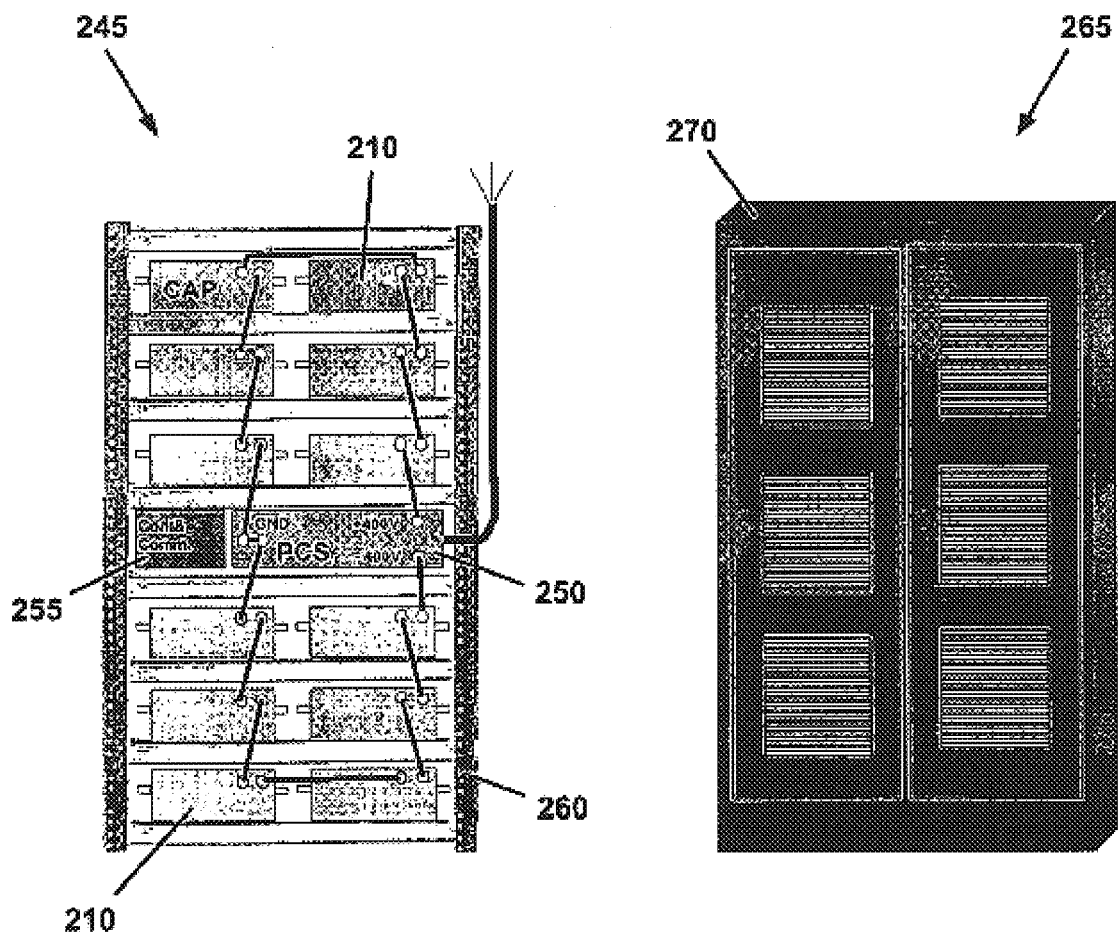
FIG. 11A  FIG. 11B

SYSTEM AND METHOD OF FORMING CAPACITOR-BASED ELECTRICAL ENERGY STORAGE MODULES

CROSS-REFERENCE TO RELATED APPLICATION

This application is a continuation of U.S. application Ser. No. 10/173,917, filed Jun. 18, 2002, now U.S. Pat. No. 6,518,734 which is expressly incorporated herein by reference.

BACKGROUND AND SUMMARY OF THE INVENTION

The present invention relates to the creation of electrical energy storage modules and, more particularly, to electrical energy storage modules of high-energy storage capacity, comprising one or more capacitor-based electrical energy storage submodules. The individual modules may be of various size and storage capacity, and may be provided in various combinations and configurations for residential, commercial, industrial, telecommunications, utility and other uses. Each module may also be equipped with a variety of power conversion and control electronics. A number of modules may be connected to form an electrical energy storage module or system of larger capacity.

There are many situations wherein there is a need for a source of stored electrical energy. Such situations may include, for example, the need to provide electrical power to remotely located equipment that may not be supplied by power from a utility. Stored electrical energy may also be used to supply power to a residential, commercial or industrial customer during periods of utility power interruption, or to supplement power supplied thereto by a utility during periods of extreme demand. It is also desirable to store quantities of electrical energy sufficient to meet the demands of a residential, commercial or industrial customer for an extended period of time. In this manner, a customer may charge the storage device(s) during periods when the cost to purchase electrical energy is low, and discharge the device(s) to satisfy demand during periods when the cost to purchase electrical energy is higher. Consequently, such devices may be used in peak shaving or load-leveling systems to help electrical utilities meet peak demand.

The present invention provides such an electrical energy storage device. The present invention contemplates the use of capacitor-based electrical storage systems, comprised of one or more electrical energy storage modules of high-energy storage capacity. The capacitor-based electrical energy storage systems/modules of the present invention are preferably capable of operating at a nominal continuous rated power output for a period of several hours, and may also be able to operate at a reduced power output for significantly longer periods of time. The capacitor-based electrical energy storage systems/modules of the present invention are also preferably capable of a substantially higher power output of relatively short duration. Unlike many other electrical energy storage devices, the capacitor-based electrical energy storage modules of the present invention are also capable of performing load following, wherein the power output of a module(s) can automatically increase or decrease in response to changing demands thereon. Such systems/modules may be of stationary, fixed, or transportable design.

Each electrical energy storage module is comprised substantially of one or more capacitor-based electrical energy storage submodules located in a specialized enclosure or cabinet, and may also include a power conversion system (PCS) and control electronics. One or more cabinets, each having one or more submodules, may constitute a single module. The submodule contains the means for storing the electrical energy. Preferably, the submodule contains one or more capacitors designed to store electrical energy. Capacitors of various design and construction may be utilized in this regard, however, a capacitor of electrochemical type is preferred for its high energy density. Electrochemical capacitors are capable of having a high charge density, meaning that a considerable quantity of electrical energy may be stored in a relatively small volume. The submodule may also have other features, such as lifting means, a means of automatic electrical connection, and its own PCS and/or control electronics.

Each electrical energy storage submodule is preferably located and secured within a designated space of the enclosure or cabinet. The cabinet is preferably designed to have openings of predetermined size that are designed to act as both mechanical and electrical receptacles for receiving the submodules. The submodules and cabinet are typically adapted to allow a submodule to slide into each of the receptacles in the cabinet. Preferably, the cabinet is prewired so that when each submodule is inserted therein, a connecting means on that submodule will electrically connect it, via the cabinet wiring, to other submodules in the cabinet. The modules may be connected in series or parallel to produce a desired output. Wiring of the cabinet in this manner also allows each submodule to be charged from a single input location. Preferably, one or more receptacles are also provided in each cabinet to receive a PCS and/or control electronics.

One or more cabinets containing one or more submodules and/or power conversion and control electronics may be connected to produce a module of larger electrical energy storage and output capacity. The cabinets may be connected in series or parallel to obtain the desired storage capacity/power output. A transformer may be used in conjunction with a module to increase the module's output voltage. A number of modules (e.g., three) with the appropriate power conversion electronics and/or transformer(s) may be combined to create a 3-phase power output (e.g., one module per phase) or, alternatively, a single module may produce a balanced 3-phase power output.

In alternate embodiments of the present invention, the cabinets for storing and connecting individual submodules may be open or may be enclosed. The cabinets may be designed to allow for insertion of the submodules, of which at least one side thereof will remain visible after installation. Such a cabinet may be used when the cabinet and submodules will not be exposed to inclement conditions. Such a cabinet also allows for easy access to each submodule, should a submodule need to be removed for repair or replacement. The cabinet may also be enclosed, such as by providing doors or other means for sealing off the cabinet after installation of the submodule(s). This type of cabinet may be used when it will be exposed to inclement conditions, such as may be encountered when the cabinet is located outdoors, or in a harsh indoor environment.

The design of the submodules, modules, and cabinets of the present invention allow for a high degree of flexibility in assembling a capacitor-based electrical energy storage system that can meet particular needs. Many of the systems are designed with the intent that the submodules may be installed/removed by hand; further adding to their flexibility. A multitude of configurations and capacities are possible, as can be seen by the reference to the following detailed description and related drawings.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 1 is one embodiment of a single-bay, single-phase, capacitor-based electrical energy storage module of the present invention, designed to nominally output approximately 6 kW of power for about 5 hours at 110 volts AC (RMS);

FIG. 2 is an alternate embodiment of the present invention, comprising a dual-bay, single-phase, capacitor-based electrical energy storage module designed to nominally output approximately 6 kW of power for about 5 hours at 110 volts AC (RMS);

FIG. 3 is one embodiment of a 3-phase, capacitor-based electrical energy storage module of the present invention, utilizing single-bay cabinets, and capable of nominally outputting approximately 18 kW of 480/277 volt, 3-phase AC power for about 5 hours;

FIG. 10 is an isometric view of an alternate embodiment of a capacitor-based electrical energy storage submodule of the present invention, capable of nominally outputting approximately 1.1 kW of DC power for about 5 hours;

FIG. 11A illustrates one embodiment of a basic, large-scale capacitor-based electrical energy storage module of the present invention, wherein the storage module is comprised of a plurality of the submodules of FIG. 10, and is capable of nominally outputting approximately 13 kW of 3-phase AC power for approximately 5 hours;

FIG. 11B illustrates an alternate embodiment of a basic, large-scale capacitor-based electrical energy storage module of the present invention, wherein the storage module of FIG. 11A is enclosed within a protective housing;

DETAILED DESCRIPTION OF THE EXEMPLARY EMBODIMENT(S)

Figure 4:
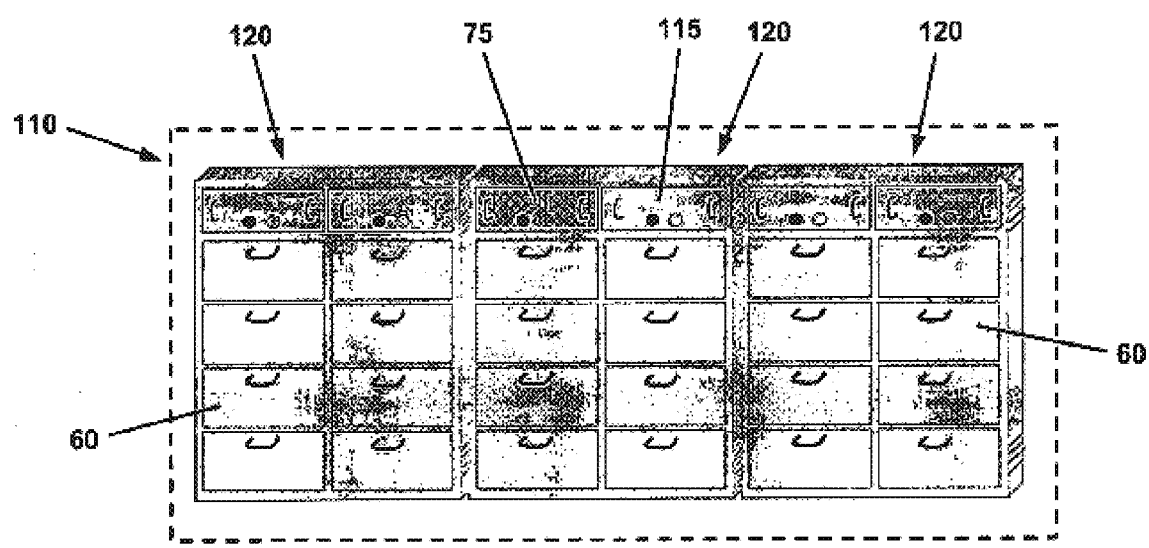
FIG. 4 is an alternate embodiment of a 3-phase, capacitor-based electrical energy storage module of the present invention, utilizing dual-bay cabinets, and capable of nominally outputting approximately 18 kW of 480/277 volt, 3-phase AC power for about 5 hours.

The present invention contemplates the construction of capacitor-based electrical energy storage modules/systems of high-energy capacity. The electrical energy storage systems are constructed from one or more of the electrical energy storage modules, each having one or more capacitor-based electrical energy storage submodules. The modularity of the electrical energy storage modules allows for the construction of electrical energy storage systems that may be used to meet the electrical power demands of a variety of users, in a multitude of situations and locations. The modules may have various sizes, shapes, and capacities, based on the environment in which they will operate and the amount of electrical energy and power they will store and output. The modules may employ submodules containing a plurality of specialized capacitors to store and discharge electrical energy. A variety of capacitors may be suitable for this purpose. However, due to their high charge density, it has been found that electrochemical capacitors are well suited for such use. There are numerous currently existing electrochemical capacitor designs. A suitable electrochemical capacitor has been generally, previously described in U.S Pat. No. 6,222,723, which is hereby incorporated by reference herein. In this type of double-layer electrochemical capacitor, capacitor cells are constructed from a first electrode and a second electrode, which may have a dissimilar absolute capacitance. An aqueous or organic electrolyte is located between the electrodes. This design allows the full capacitance value of the smaller capacitance value electrode to be realized, thereby providing a storage device of high energy storage density. Other types of high energy density capacitors may also be employed.

A plurality of exemplary embodiments of capacitor-based electrical energy storage modules/systems according to the present invention are provided below for purposes of illustration. For each exemplary embodiment, a "nominal" continuous power rating is provided. The "nominal" power rating, as used herein, is defined to be the amount of power that can be substantially instantaneously, and continuously output from the capacitor-based electrical energy storage module/system for a predetermined amount of time (e.g., 600 kW for 5 hours). It should also be realized, however, that each of the exemplary capacitor-based electrical energy storage modules/systems illustrated below can also be operated at a reduced power output for a longer period of time (i.e., each module/system is also inherently capable of an "extended" power output). Similarly, each of the exemplary capacitor-based electrical energy storage modules/systems illustrated below can also be operated at an increased power output for a substantially reduced period of time (i.e., each module/system is also inherently capable of a "short-term" power output). While each of the exemplary capacitor-based electrical energy storage modules/systems illustrated below are thus capable of both an extended power output and a short-term power output, no particular rating is given therefor, as such will depend on the particular power conversion electronics employed, and the power output level desired.

Another feature of the capacitor-based electrical energy storage modules/systems of the present invention, that is not typical of electrical energy storage devices, is the ability to "load follow". This means that the module or system is able to automatically adjust its power output in response to changing demands for electric power. For example, an embodiment of an electrical energy storage system of the present invention may be connected to a business or home, which business or home also receives electric power through the grid of an electric utility. If the electrical energy storage system of the present invention is used to satisfy only a certain percentage of the business or home's electric power requirements, and the business or home suddenly becomes disconnected from the utility grid (such as during a power outage), the electrical energy storage system of the present invention is able to automatically increase its power output in response to the increased load that will then be transferred thereto. Similarly, the power output of an electrical energy storage module/system of the present invention can be automatically adjusted in response to additional electric power consuming devices being connected thereto, or disconnected therefrom. Hence, the capacitor-based electrical energy storage modules/systems of the present invention are able to "load follow" in a variety of situations.

One embodiment of a single-phase, capacitor-based electrical energy storage module 10 of the present invention can be observed in FIG. 1. This particular electrical energy storage module 10 is designed to provide 110 volt (RMS) AC output of the DC electrical energy stored therein. As can be seen, the electrical energy storage module 10 is comprised of a cabinet 15 that houses several individual capacitor-based electrical energy storage submodules 20 in a single column or bay of corresponding receptacles 25. A power conversion system (PCS) 30 may also be provided in a receptacle 35 within the cabinet 16, or the receptacle 35 may be used to house an additional submodule. In this embodiment, the electrical energy storage module 10 has a DC voltage of several hundred volts. The PCS 30 allows incoming AC electrical power to be converted into DC electrical energy for storage in the submodules 20. The PCS 30 is also used to convert the stored DC electrical energy into a single-phase AC power output, such as a 60 Hz/110V (RMS), or 50 Hz/220V (RMS) output that may be useful for residential and small commercial applications, for example. When fully charged, the electrical energy storage module 10 shown is capable of nominally outputting 6 kW of 50 Hz/110 volt (RMS), or 60 Hz/220 volt, single-phase AC power continuously for about 5 hours. The module 10 is able to store approximately 30 kWh of useful energy.

Preferably, the single-phase, capacitor-based electrical energy storage module 10 is designed to be compact in size, such that the cabinet 15 can fit through standard residential doorways, and be transported through stairways. This particular embodiment of the single-phase electrical energy storage module 10 is approximately 2 feet wide, approximately 3.5 feet deep, and approximately 6.5 feet high, although the module may also be designed with other dimensions. Similarly, the submodules 20 are preferably sized to allow for the transport thereof through a residential location. The size of the submodules 20 preferably also allows for their installation and removal from the cabinet 15 without the use of lifting device, such as a forklift. Rather, each submodule 20 is preferably provided with handles 40 or similar features that allow each submodule to be lifted and installed to, or removed from, the cabinet 15 by one or more persons.

Another embodiment of a single-phase, capacitor-based electrical energy storage module 50 of the present invention can be observed by reference to FIG. 2. This particular electrical energy storage module 50 is designed to provide a single-phase AC power output of conventional utility secondary voltage, such as, for example, a 60 Hz/110V (RMS) or 50 Hz/220V (RMS) output. As can be seen, the module 50 is comprised of a cabinet 55 that houses a plurality of the individual capacitor-based storage submodules 60 in two columns or bays of corresponding receptacles 65. A power conversion system (PCS) 70 and a DC/DC converter 75 may also be provided in corresponding receptacles 80, 85 within the cabinet 55, or the receptacles 80, 85 may be used to house additional submodules 60. This embodiment of the electrical energy storage module 50 is also rated at several hundred volts DC. The PCS 70 and DC/DC converter 75 allow incoming AC electrical power to be converted into DC electrical energy for storage in the submodules 60, and allow the stored DC electrical energy to be converted to AC or regulated DC electrical power for output to a load. When fully charged, the electrical energy storage module 50 shown is capable of nominally outputting approximately 6 kW of single-phase AC power continuously for about 5 hours. Thus, the module 50 is able to store approximately 30 kWh of useful energy.

Like the electrical energy storage module 10, the single-phase electrical energy storage module 50 is preferably designed to be compact in size, such that the cabinet 55 can fit through standard residential doorways, and be transported through stairways. This particular embodiment of the single-phase electrical energy storage module 50 is approximately 4 feet wide, approximately 2.5–3 feet deep, and approximately 4.5 feet high, although the module may also be designed to have other dimensions. Similarly, the submodules 60 are sized to allow for the transport thereof through a residential location. The size of the submodules 60 preferably also allows for their installation and removal from the cabinet 55 without the use of lifting device, such as a forklift. Rather, each submodule 60 is preferably provided with handles 90 or similar features that allow each submodule to be lifted and installed to, or removed from, the cabinet 55 by one or more persons.

An embodiment of a commercial, capacitor-based electrical energy storage module 100 of the present invention can be observed in FIG. 3. This particular electrical energy storage module 100 is designed to provide a 3-phase, 480 volt AC power output from the electrical energy stored therein. As can be seen, the module 100 is comprised substantially of three of the single-phase electrical energy storage modules 10 shown in FIG. 1. The single-phase electrical energy storage modules 10 are connected in a 3-phase configuration, so that the nominal output of the commercial module 100 is approximately 18 kW of AC power continuously for about 5 hours. The module 100 is able to store approximately 90 kWh of useful energy. The use of multiple single-phase electrical energy storage modules 10 to create the commercial, 3-phase electrical energy storage module 100, provides for reduced field engineering and reduced production costs.

An alternate embodiment of a commercial, capacitor-based electrical energy storage module 110 according to the present invention is illustrated in FIG. 4. This particular electrical energy storage module 110 is designed to provide a 3-phase, 480 volt AC power output from the electrical energy stored therein. As can be seen, the module 110 is comprised substantially of three of the single-phase electrical energy storage modules 50 shown in FIG. 2. However, while the single-phase electrical energy storage modules may have the same DC/DC converter 75, they are preferably modified to utilize a different PCS 115. Consequently, the power output from each cabinet 120 of submodules 60 is single phase, at approximately 277 volts AC. The three cabinets 120 of submodules 60 are then connected to provide one, 3-phase/ 480 volt AC output. The nominal power output of the commercial electrical energy storage module 110 is approximately 18 kW continuously for about 5 hours. The module 110 is able to store approximately 90 kWh of useful energy.

Figure 5A:
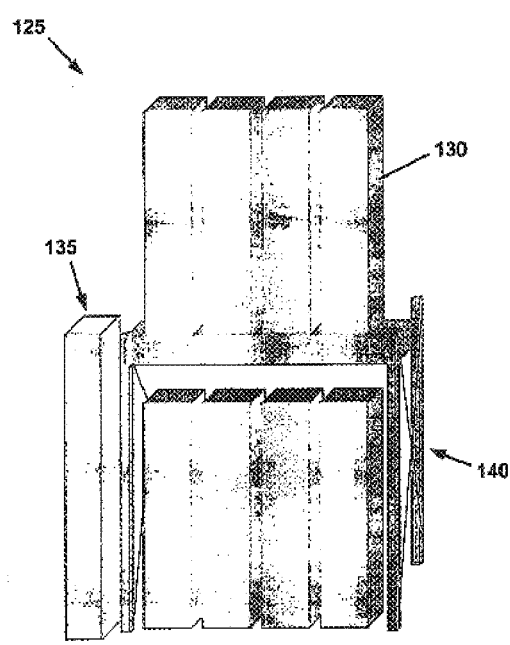
FIG. 5A is one embodiment of an industrial, capacitor-based electrical energy storage module of the present invention, capable of nominally outputting approximately 60 kW of power for about 5 hours.

One embodiment of a basic, capacitor-based industrial electrical energy storage module 125 of the present invention is depicted in FIG. 5A. The industrial module 125 is constructed substantially by connecting two sets of four single-phase modules (for a total of 8 modules), similar to the single-phase module 10 shown in FIG. 1. However, unlike the single-phase module 10 shown in FIG. 1, wherein the uppermost receptacle 25 thereof is fitted with a PCS 30, each receptacle (not shown) of the cabinet 130 of the basic industrial electrical energy storage module 125 is filled with a submodule 20. Thus, each cabinet 130 contains 5 submodules. The four cabinets 130 of each parallel set are connected in series. In this embodiment of the basic industrial electrical energy storage module 125, each cabinet provides approximately 750 volts of DC electrical energy. A PCS 135 is preferably provided as part of the basic industrial electrical energy storage module 125, for converting the stored DC electrical energy in the capacitors to 3-phase AC, or regulated DC power, for output to a load. The basic industrial electrical energy storage module 125 has a fully charged output of approximately 2800 Vdc. The nominal power output of the basic industrial electrical energy storage module 125 is approximately 60 kW continuously for about 5 hours. The basic industrial electrical energy storage module 125 is able to store approximately 300 kWh of useful energy. Since this particular embodiment of the basic industrial electrical energy storage module 125 is designed for use indoors or in non-inclement environments, the cabinets 130 may be-arranged on a rack 140 or similar apparatus. In an industrial setting, it may also be possible to utilize a cabinet 130 having open sides, or that is generally more accessible. A plurality of basic industrial electrical energy storage modules 125 may be combined to create industrial storage modules/systems of greater storage capacity.

Figure 5B:
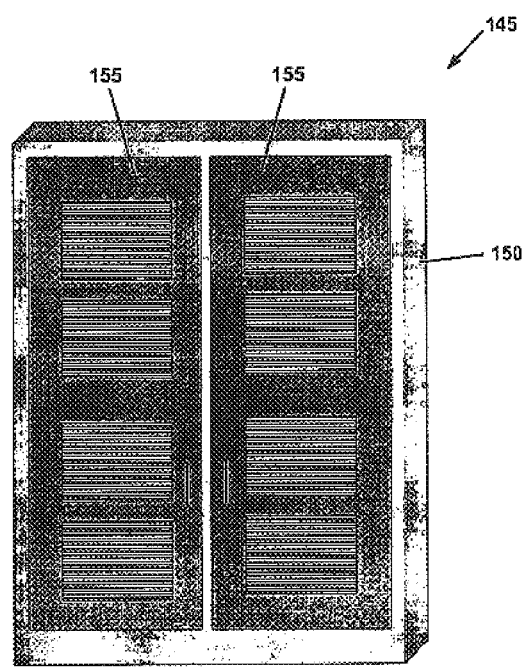
FIG. 5B is an alternate embodiment of an industrial, capacitor-based electrical energy storage module, designed for outdoor/harsh environment use, and capable of nominally outputting approximately 60 kW of power for about 5 hours.

When harsh conditions may be encountered, such as may occur outdoors, or when access thereto by non-qualified persons is to be prohibited, it is preferable that a protected basic industrial electrical energy storage module 145 be utilized. As shown in FIG. 5B, the protected basic industrial electrical energy storage module 145 is comprised essentially of an unprotected basic industrial electrical energy storage module 125 enclosed within a protective housing 150. The protective housing 150 preferably has doors 155 or similar means for allowing access to the submodules 20 and PCS 135, while still providing protection for the module components and ensuring the safety of persons who may come in contact with the housing. The power output of the protected basic industrial electrical energy storage module 145 shown, is the same as the power output of the unprotected basic industrial electrical energy storage module 125. As with the basic industrial electrical energy storage module 125, a plurality of protected basic industrial electrical energy storage modules 145 may be combined to create protected industrial storage modules/systems of greater storage capacity.

Figure 6:
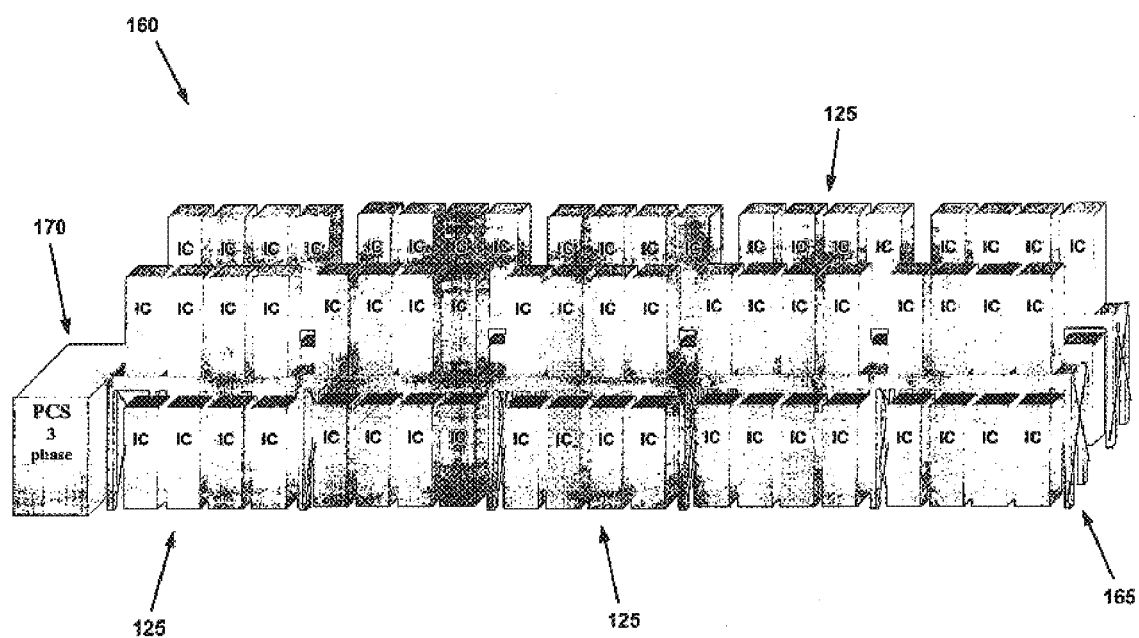
FIG. 6 is one embodiment of a utility or large industrial, capacitor-based electrical energy storage system of the present invention, capable of nominally outputting approximately 600 kW of 3-phase AC power for about 5 hours.

An embodiment of a utility or large industrial, capacitor-based electrical energy storage module/system 160 of the present invention can be seen in FIG. 6. The utility or large industrial electrical energy storage system 160 is constructed substantially from parallel, interconnected sets of the basic industrial electrical energy storage modules 125 shown in FIG. 5A. The basic industrial electrical energy storage modules 125 are shown to be arranged within a rack 165, which helps to minimize the required floor space. In order to protect the individual basic industrial electrical energy storage modules 125 and submodules 20 thereof from inclement or otherwise harsh environmental conditions, and/or for safety reasons, the utility or large industrial electrical energy storage system 160 may be placed under roof or within a building. A 3-phase PCS 170 is provided to control the output of DC electrical energy stored within the utility or large industrial electrical energy storage system 160. This embodiment of the utility or large industrial electrical energy storage system 160, produces a nominal output of approximately 600 kW of 3-phase AC power for a period of about 5 hours. The utility or large industrial electrical energy storage system 160 is able to store approximately 3 MWh of useful energy.

Figure 7:
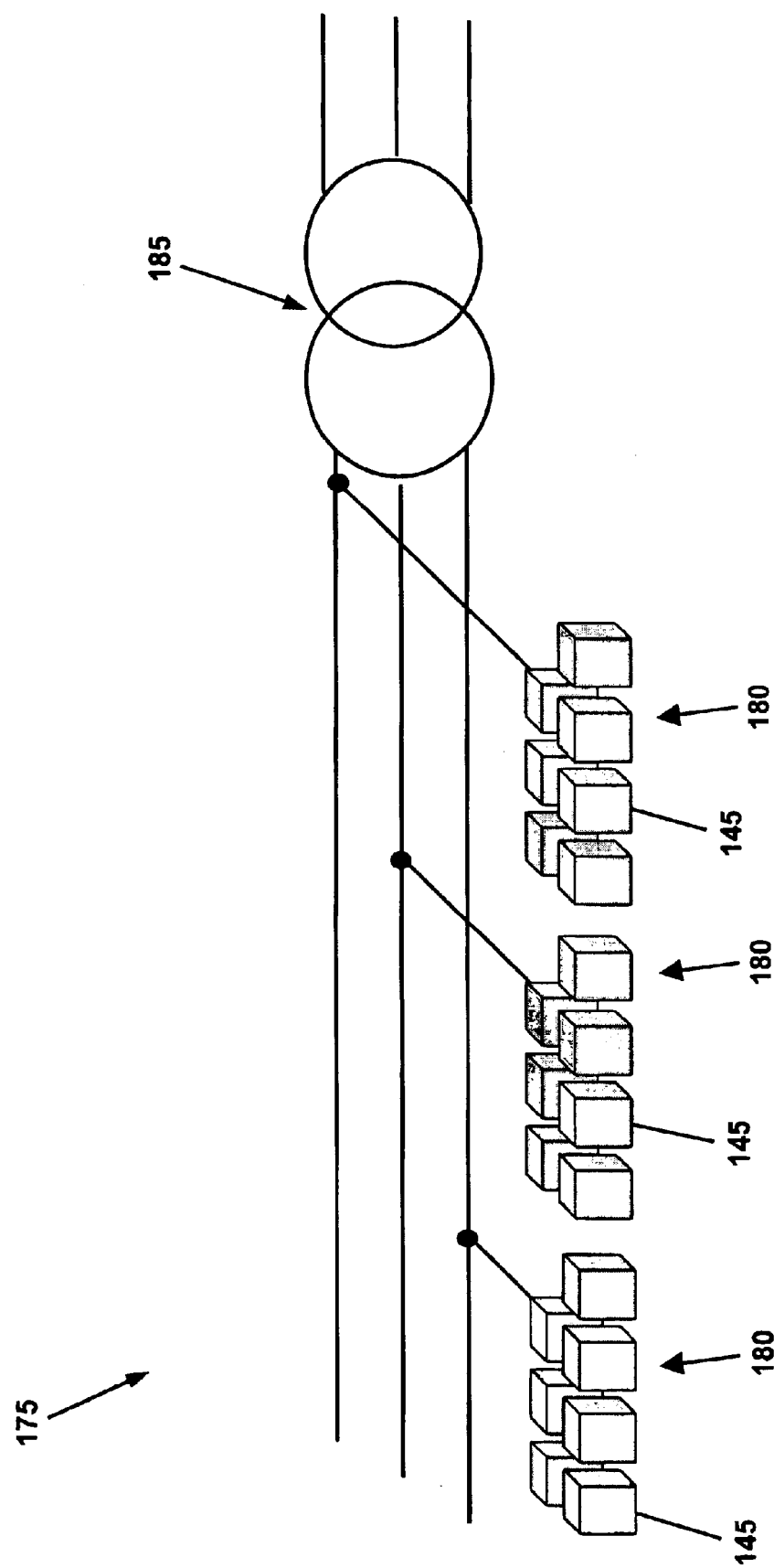
FIG. 7 is an alternate embodiment of a utility or large industrial, capacitor-based electrical energy storage system of the present invention, utilizing a transformer to increase the output voltage of the module, and having a nominal 3-phase AC power output of approximately 500 kW for about 5 hours.

An alternate embodiment of a utility or large industrial, capacitor-based electrical energy storage system 175 of the present invention can be seen in FIG. 7. The utility or large industrial electrical energy storage system 175 is constructed substantially from a multitude of interconnected protected basic industrial electrical energy storage modules 145 shown in FIG. 5B. In this particular embodiment, the utility or large industrial electrical energy storage system 175 is comprised of three groups 180 of seven protected basic industrial electrical energy storage modules 145. Each of the three groups of seven protected basic industrial electrical energy storage modules 145 provides one phase of the 3-phase output of the system 175. Each phase is preferably rated at 277 volts AC, and has a nominal power output of approximately 170 kW continuously for about 5 hours. Each phase is capable of storing approximately 850 kWh of useful energy. The utility or large industrial electrical energy storage system 175 also utilizes a transformer 185 to increase the output voltage thereof. In this embodiment, a 480 Vac transformer 185 is used to raise the output of the utility or large industrial electrical energy storage system 175 to approximately 12.5 kV. However, it should be realized that transformers providing for a different change in voltage may be used depending on the voltage of the associated distribution and transmission grid or other load to which electrical power will be supplied. Once each of the three phases is connected and subjected to the transformer 185, the nominal power output of the utility or large industrial electrical energy storage system 175 is approximately 500 kW continuously for about 5 hours. The utility or large industrial electrical energy storage system 175 is able to store approximately 2.5 MWh of useful energy.

Figure 8:
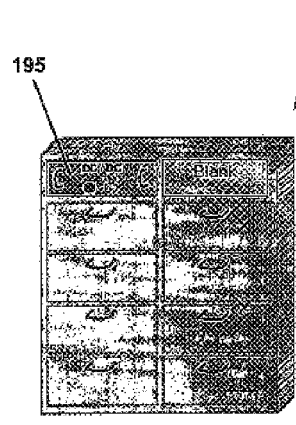
FIG. 8 is an alternate embodiment of a capacitor-based electrical energy storage module of the present invention, designed to nominally output approximately 6 kW of power at a regulated DC voltage, for about 5 hours.

A regulated DC, capacitor-based electrical energy storage module 190 is illustrated in FIG. 8. The regulated DC electrical energy storage module 190 is very similar to the single-phase electrical energy storage module 50 depicted in FIG. 2, except that a specialized DC/DC converter 195 is provided to produce a DC power output of regulated voltage. The regulated DC electrical energy storage module 190 is especially well suited for use in the telecommunications field. In the embodiment shown, the DC output is fixed at 48 volts. Other regulated output voltages are also possible. The nominal power output of the regulated DC electrical energy storage module 190 is approximately 6 kW continuously for about 5 hours. The regulated DC electrical energy storage module 190 is able to store approximately 30 kWh of useful energy.

Figure 9A:
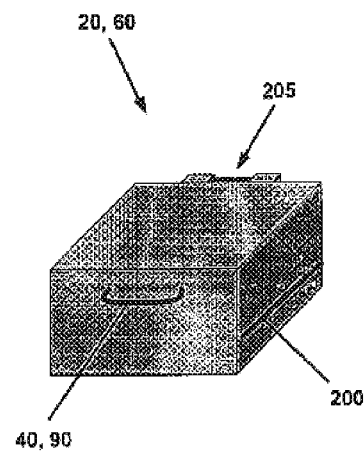
FIG. 9A is a frontal isometric view of one embodiment of a capacitor-based electrical energy storage submodule of the present invention.
Figure 9B:
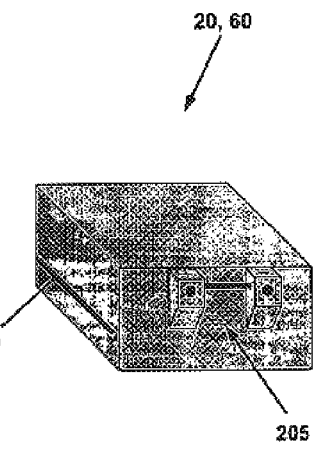
FIG. 9B is a rearward isometric view of the capacitor-based electrical energy storage submodule of FIG. 9A.

One embodiment of a capacitor-based electrical energy storage submodule 20, 60 of the present invention is shown in more detail in FIGS. 9A and 9B. The submodule 20, 60 can be seen to have a guideway 200 designed to mate with a corresponding feature within the receptacle of a cabinet. The guideway 200 aids in the installation and removal of the submodule 20, 60 to the cabinets. An electrical connector 205 is preferably provided on the submodule 20, 60 for connecting the submodule to the wiring of the cabinet. It should be understood that both the submodule 20, 60 and the electrical connector may have a variety of designs, and those shown in FIGS. 9A and 9B are provided solely for the purpose of illustration, and not limitation.

In each of the embodiments described above, the cabinet used is designed to allow easy installation and removal of the submodules. The cabinet may have guide rails or other features that engage with a portion of each submodule, such as the guideway 200 of FIGS. 9A and 9B, to aid in installation or removal thereof. It is also preferred that each cabinet be prewired to accept the particular number of submodules for which it is designed. Prewiring of the cabinets provides for several advantages, including: elimination of the need to wire the cabinets on site, which is expensive, time consuming, and subject to errors; making the wiring and connections substantially inaccessible to unqualified individuals; and, to further the modular aspect of the invention by allowing the number of submodules to be expanded without having to perform additional wiring. Preferably, a pin connector or some other form of electrical connector is provided at each receptacle to mate with a corresponding electrical connector (such as the connector 205 depicted in FIGS. 9A and 9B) on each submodule. For example, an electrical connector can be located at the back of each receptacle, so that the corresponding connector on the back of each submodule will become engaged therewith as the submodule is installed to the cabinet. Preferably, the male connector is located in the cabinet and the female connector is located on the submodule to minimize the risk of damage thereto or injury to a person installing the submodule. A locking device (not shown) may be optionally provided to prevent removal of a submodule when current is flowing thereto or therefrom. Alternatively, a load-breaking connection may be provided.

An alternate embodiment of a capacitor-based electrical energy storage submodule 210 of the present invention is depicted in FIG. 10. Each electrical energy storage submodule 210 may be fitted with its own PCS (not shown), whereby each submodule may be considered an AC storage module. Although not essential, when provided, the submodule PCS may be detachable from a storage portion 215 of the electrical energy storage submodule 210 to allow for easier installation, removal, and maintenance of the submodule. As show in FIG. 10, the submodule 210 does not have its own PCS. In this particular embodiment, the electrical energy storage submodule 210 is comprised of 35 stacked capacitor cells 220, although other capacitor cell quantities and arrangements are, of course, possible. The capacitor cells 220 may be of the variety previously described, or may be of another suitable type currently available or not yet invented. Preferably, a cell retaining device 225, such as the metal belt shown, is provided to assist with compression of the capacitor cells 220. A lifting member 230 may be located on at least two opposite sides of the electrical energy storage submodule 210. The lifting member 230 can be utilized when lifting the electrical energy storage submodule 210 by means of a forklift or similar device. Handles 235 may be attached to the lifting members 230 to provide a gripping point during manual movement of the electrical energy storage submodule 210. The lifting members may also provide for additional compression of the capacitor cells 220. Electrical connectors 240 are preferably provided to allow for the interconnection of multiple submodules 210. This particular embodiment of the electrical energy storage submodule 210 has sufficient DC electrical energy storage capacity to provide a continuous, nominal, AC electric power output of approximately 1.1 kW for about 5 hours.

A basic large-scale, capacitor-based electrical energy storage module 245, 265 utilizing a plurality of the electrical energy storage submodules 210 can be seen in FIGS. 11A and 11B, respectively. More specifically, the basic large-scale electrical energy storage module 245 uses 12 of the electrical energy storage submodules 210 arranged in a series-connected string. Preferably, a power conversion system (PCS) 250 and control and communication electronics 255 are integral to the basic large-scale electrical energy storage module 245. The PCS 250 and control and communication electronics 255 may be located at a mid-point between the included submodules 210, thereby dividing the approximately 800 volt capacitor string into two capacitor strings of about 400 volts. However, the PCS 250 and control and communication electronics 255 may also be alternately located within the module 245, such as near the top or bottom thereof. In an alternative embodiment of the present invention, the PCS 250 and control and communication electronics 255 may be inherent to each submodule 210. The nominal power output of the basic large-scale electrical energy storage module 245 shown is approximately 13 kW at 480/277 volt, 3-phase AC, continuously for about 5 hours. Preferably, a synchronous device (not shown), providing a synchronous signal, is provided to control all of the individual submodules 210. The synchronous device ensures that the AC voltages produced by the collection of series connected submodules 210 are in phase with each other. Preferably, the submodules 210 are arranged on a storage rack 260 or similar structure. Storage racks sufficient for this purpose are commercially available in numerous sizes and configurations. Alternatively, the storage rack 260 could be custom fabricated to meet the needs of particular applications. When arranged as shown in FIG. 11A, the basic large-scale electrical energy storage module 245 is approximately 5 feet in width and approximately 10 feet in height, although other dimensions are also possible depending on submodule size, module arrangement, and the rack used. As can be observed in FIG. 11B, a protected basic large-scale, capacitor-based electrical energy storage module 265 may also be constructed by enclosing a basic large-scale electrical energy storage module 245 within a protective housing 270. A protected basic large-scale electrical energy storage module 265 may be used, for example, when there is a concern regarding the exposure of the submodules 210 to inclement weather and/or to unauthorized persons. As is described in more detail below, the basic large-scale electrical energy storage modules 245, 265 can be used as a building block to construct larger commercial/industrial/utility electrical energy storage modules/systems.

Figure 12:
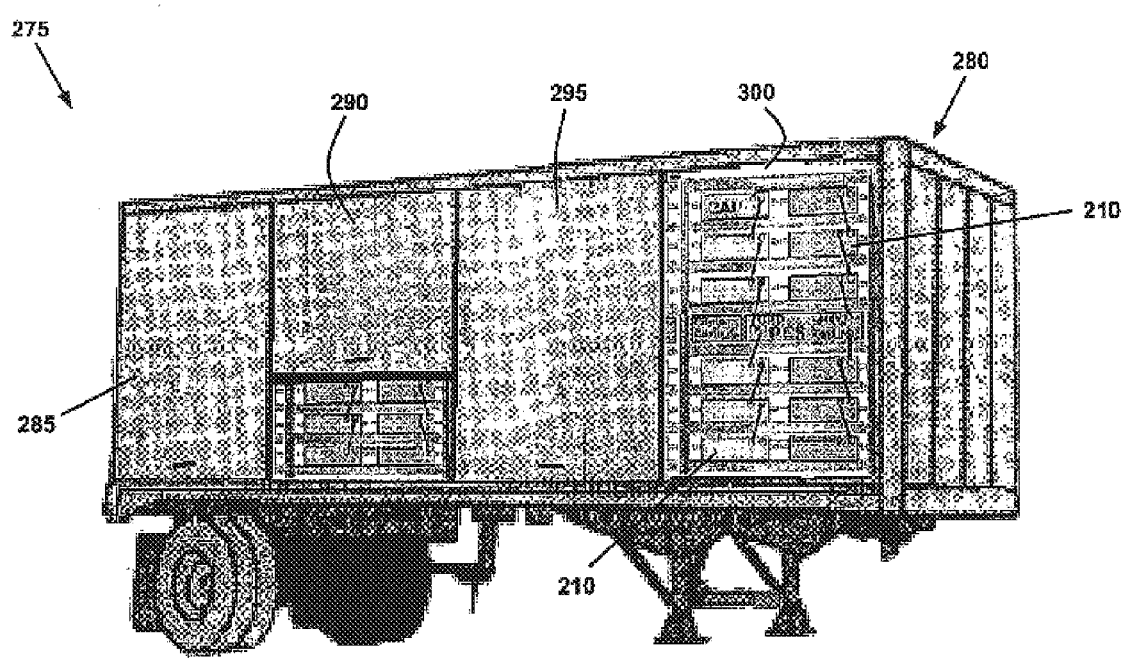
FIG. 12 shows one embodiment of a large-scale, transportable capacitor-based electrical energy storage system of the present invention intended for commercial/industrial use, which system consists of a number of the storage modules of FIG. 11A, and is capable of nominally outputting approximately 100 kW of 3-phase AC power for about 5 hours.

An embodiment of a large-scale, transportable capacitor-based electrical energy storage system 275 intended for commercial/industrial use is shown in FIG. 12. Preferably, a plurality of the basic large-scale electrical energy storage modules 245 are disposed within a trailer 280. Each basic large-scale electrical energy storage module 245 may have its own rack, such as the storage rack 260 shown in FIG. 11A. Alternatively, a custom rack may be assembled inside of the trailer 280 to receive the required number of submodules 210. Preferably, the trailer 280 is provided with one or more doors 285–300 on either side thereof, such that the components of the basic large-scale electrical energy storage modules 245 may be accessed. The basic large-scale electrical energy storage modules 245 located within the trailer 280 are connected so that the large-scale, transportable electrical energy storage system 275 provides the desired power output. In the particular embodiment shown, the large-scale, transportable electrical energy storage system 275 is able to nominally output approximately 100 kW of 480 volt, 3-phase AC power for about 5 hours.

Figure 13A:
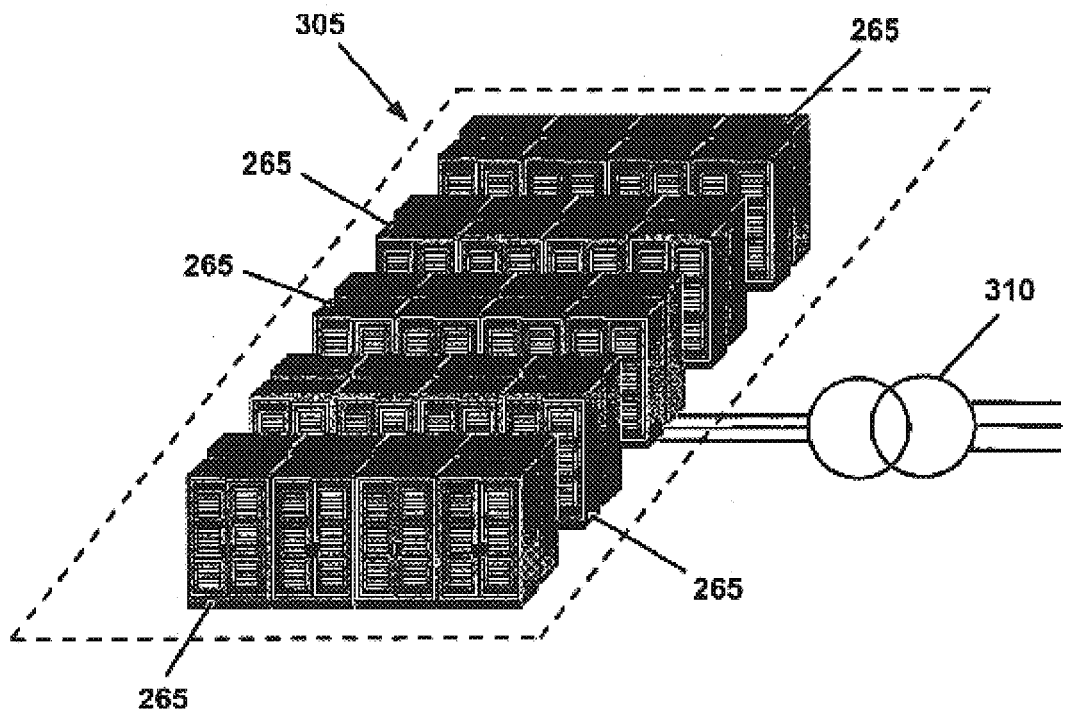
FIG. 13A shows an alternate embodiment of a large industrial/utility, capacitor-based electrical energy storage system of the present invention, wherein the industrial/utility storage system consists of a plurality of the storage modules of FIG. 11B, and is capable of nominally outputting approximately 500 kW of 3-phase AC power for about 5 hours.

An industrial/utility, capacitor-based electrical energy storage system 305 is depicted in FIG. 13A. This embodiment of the industrial/utility electrical energy storage system 305 is illustrative of how a plurality of the protected basic large-scale electrical energy storage modules 265 (FIG. 11B) may be combined to create a modular system having a larger electrical energy storage and output capacity. In this particular embodiment, 40 of the protected basic large-scale electrical energy storage modules 265 are connected together to form an electrical energy storage system 305 of greater storage capacity. A transformer 310 is utilized in conjunction with the electrical energy storage system 305 to increase the output voltage thereof. In this particular embodiment, the transformer is rated at 480V/12.5 kV, 500 kVA, although transformers of other ratings may be used to meet particular load requirements. With the transformer 310 connected thereto, the nominal output of the industrial/utility electrical energy storage system 305 is approximately 500 kW of 12.5 kV, 3-phase AC electrical power for about 5 hours (2500 kWh/2.5 MWh). Other power or voltage ratings may also be accomplished depending on the number of capacitors and the transformer(s) used.

Figure 13B:
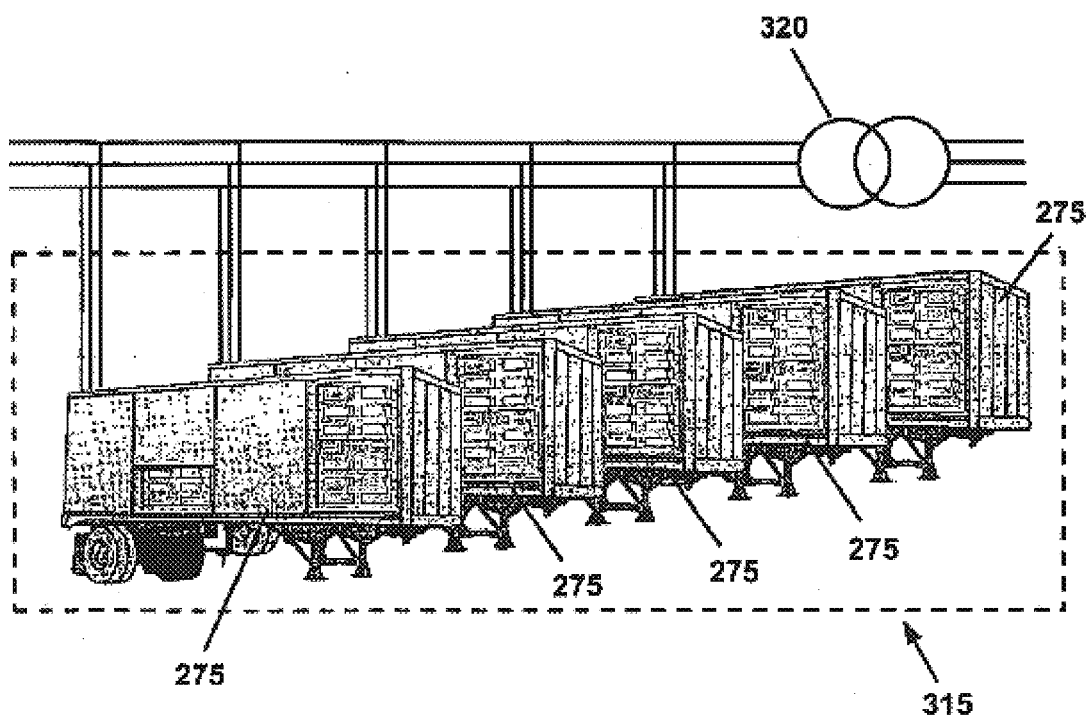
FIG. 13B is an alternate embodiment of a large industrial/utility, capacitor-based electrical energy storage system of the present invention, wherein the industrial/utility storage system consists of a plurality of the transportable storage units of FIG. 12, and is capable of nominally outputting approximately 500 kW of 3-phase AC power for about 5 hours.

An alternate embodiment of an industrial/utility, capacitor-based electrical energy storage system 315 is depicted in FIG. 13B. This embodiment of the industrial/utility electrical energy storage system 315 is illustrative of how a plurality of individual, transportable, capacitor-based electrical energy storage systems 275 (FIG. 12) may be combined to create a modular system having a larger electrical energy storage and output capacity. Because of the transportability of the individual systems/modules 275, the storage capacity of the industrial/utility electrical energy storage system 315 can be increased by simply docking another trailer 280 of modules and making the appropriate electrical connections. In this particular embodiment, 5 of the transportable capacitor-based electrical energy storage systems/modules 275 are connected together to form an electrical energy storage system 315 of greater storage capacity. A transformer 320 is utilized in conjunction with the electrical energy storage system 315 to increase the output voltage thereof. In this particular embodiment, the transformer is rated at 480V/12.5 kV, 500 kVA, although transformers of other ratings may be used to meet particular load requirements. With the transformer 320 connected thereto, the nominal output of the industrial/utility electrical energy storage system 315 is approximately 500 kW of 12.5 kV, 3-phase AC electrical power for about 5 hours (2500 kWh/2.5 MWh). Other power or voltage ratings may also be accomplished depending on the number of capacitors and the transformer(s) used.

Figure 14:
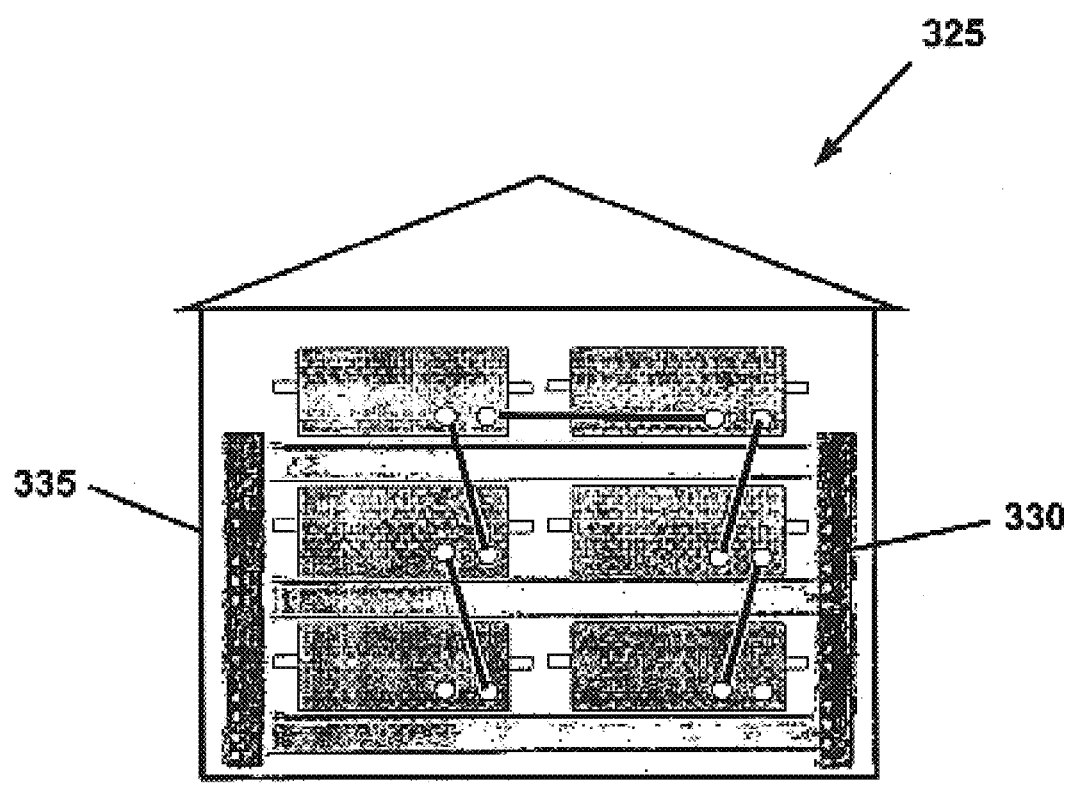
FIG. 14 depicts one embodiment of a capacitor-based electrical energy storage module of the present invention intended for small commercial or residential use, wherein the module utilizes 6 of the submodules of FIG. 10, and is capable of nominally outputting approximately 6 kW of single-phase AC power for about 5 hours.

A smaller version of a capacitor-based electrical energy storage module 325 of the present invention may be observed in FIG. 14. The electrical energy storage module 325 is intended for use in small commercial/residential applications, and can be seen to consist of 6 of the individual electrical energy storage submodules 210 of FIG. 10, connected in series. The submodules 210 are preferably arranged on a storage rack 330 or similar structure. As shown, the small commercial/residential electrical energy storage module 325 is adequate for supplying electrical power to, for example, common 50 or 60 Hz household and small commercial electrical devices. Two racks of 6 submodules 210 may be combined to supply electrical energy to electrical devices requiring a 220 volt input. If the module(s) 325 must be located in a hazardous or inclement environment, such as outdoors, a protective enclosure 335 may be used to provide protection. The small commercial/residential electrical energy storage module 325 shown is capable of nominally outputting approximately 6 kW of AC power for about 5 hours.

Figure 15:
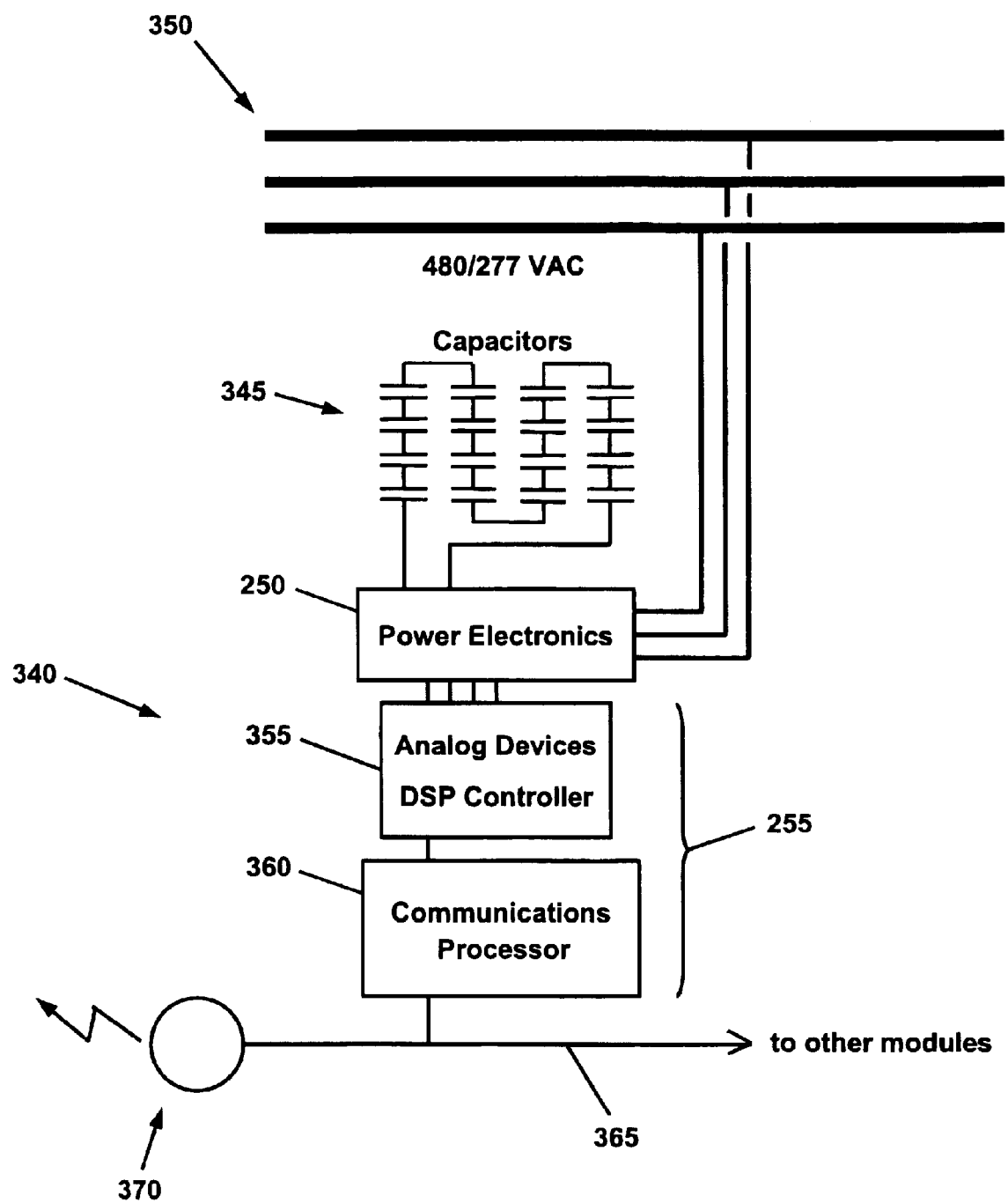
FIG. 15 shows an exemplary embodiment of a module control system for controlling the operation of a capacitor-based electrical energy storage module of the present invention.

A detailed exemplary embodiment of a module control system 340 for controlling a capacitor-based electrical energy storage module of the present invention can be observed by reference to FIG. 15. This particular embodiment of the module control system 340 is designed for use with the basic large-scale capacitor-based electrical energy storage module 245 shown in FIG. 11A. It should also be realized, however, that the module control system 340 and similar embodiments thereof, could also be used to control other capacitor-based electrical energy storage modules. The module control system 340 shown in FIG. 15 is comprised substantially of a power conversion system (PCS) 250 and a control and communications portion 255. The PCS 250 and control and communications portion 255 may be separate units or, alternatively, may be included within a single unit. As illustrated, when the basic large-scale electrical energy storage module 245 is in a discharge mode, the PCS 250 receives DC electrical energy stored in the capacitors 345 thereof, and converts the DC electrical energy into 480/277 volt AC, 3-phase electrical power. The electrical power output of the module 245 may then be delivered to a 3-phase load 350, such as, for example, a power transmission and distribution grid.

The control and communications portion 255 of the module control system 340 is in communication with the PCS 250. The control and communications portion 255 may have, for example, various devices for monitoring or controlling certain aspects of the module 245, and a digital signal processor (DSP) controller 355 for filtering or otherwise acting on communications emanating from and/or received by the module control system 340. The control and communications portion 255 also preferably serves to protect the module from damage that may occur as a result of operational anomalies. For example, the control and communications portion 255 may utilize self-protection software that can isolate and bypass operational problems. Preferably, a communications processor 360 is also in communication with the PCS 250 of the module 245. The communications processor 360 allows for embedded, programmable control over the communications between modules and/or between a central control location. In this particular embodiment of the module control system 340, communication between modules is shown to be provided by a serial data link 365, such as, for example, through a RS 485 serial interface. Various communication protocols may be employed, such as, for example, a Modbus protocol. Module-to-module communication may also be accomplished through a LAN-based system (not shown). Communication between the module control system 340 of each module and a central control location may be facilitated by a variety of means, but preferably is accomplished by wireless communication 370.

Figure 16:
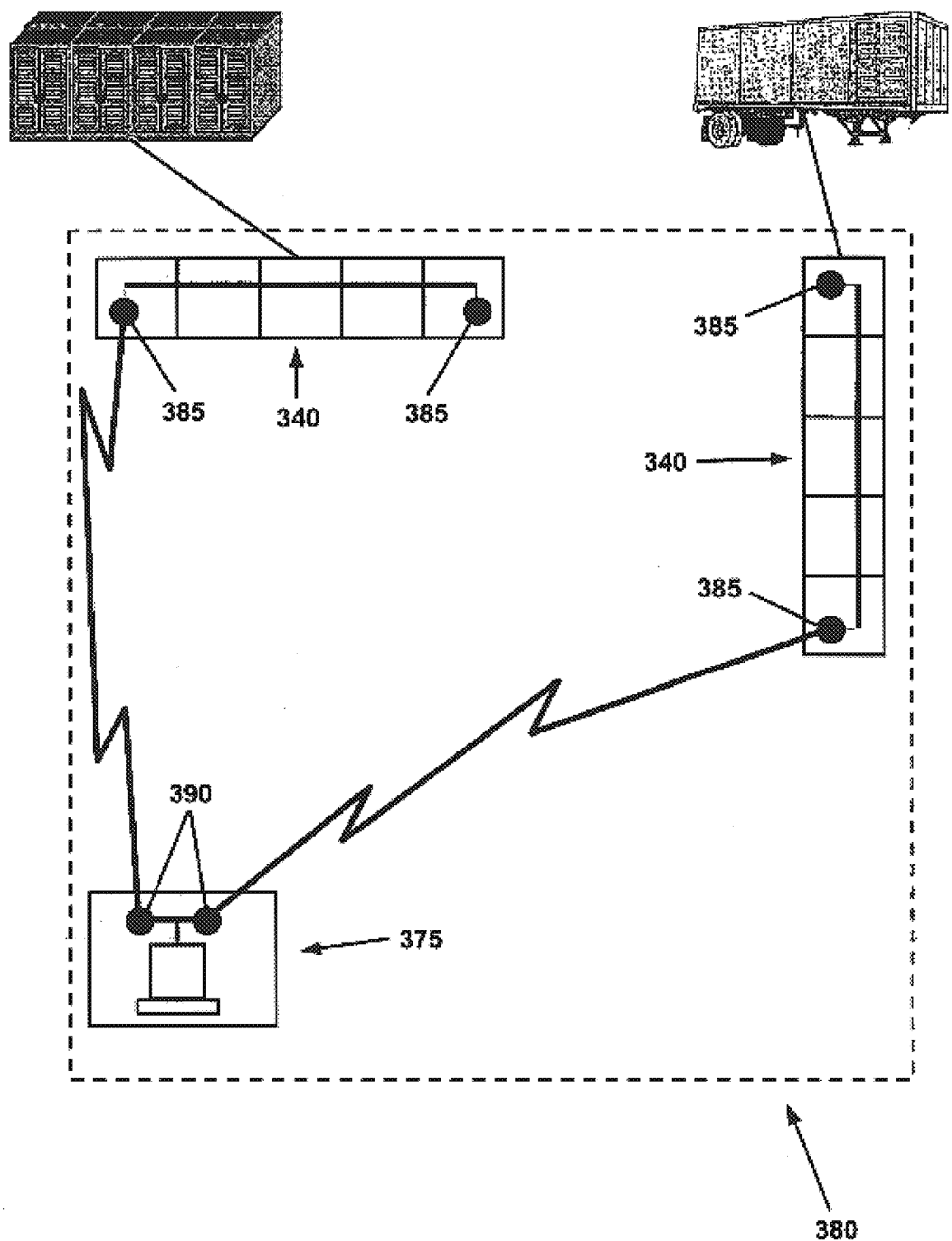
FIG. 16 illustrates the use of a central controller for communicating and controlling one or more remotely located, capacitor-based electrical energy storage modules/systems of the present invention.

An overview of one example of communication between a central controller 375 and two exemplary modular, capacitor-based electrical energy storage systems is depicted in FIG. 16. In this particular example, only two modular, capacitor-based electrical energy storage systems are shown to be in communication with the central controller 375. However, there could be a greater or lesser number of electrical energy storage modules of varying capacity in communication with the central controller 375, and the present example is provided solely for purposes of illustration, and not limitation.

As can be seen by reference to the modular electrical energy storage control system 380 illustrated in FIG. 16, each electrical energy storage system employs a serial interface to provide for communication between the individual modules (module control systems 340) included therein. Each module control system 340 may also be placed in communication with the central controller 375. In this particular example, wireless networking is used to facilitate communication between the various module control systems 340 and the central controller 375. When employing wireless communication, at least one wireless networking node 385 is preferably provided with each module control system 340 for facilitating communications between the electrical energy storage systems and the central controller 375. More preferably, at least two wireless networking nodes 385 are located at each module control system 340, to provide for redundancy in case of malfunction. At least one and, more preferably, a plurality of wireless networking nodes 390 are also provided at the central controller 375. The networking nodes 385, 390 maintain links between the central controller 375 and the various module control systems 340 of each electrical energy storage system connected thereto, initiate retries, and perform self-reorganization in case of a communications unit failure. Various wireless communication platforms may be utilized with the present invention, such as, for example, EmberNet™, IEEE 802.11b, or Frequency-Hopping Spread Spectrum.

The system and method of the present invention allows for the creation of capacitor-based electrical energy storage modules through the parallel or series connection of a plurality of submodules. While parallel wiring is possible, it is preferred that the submodules be connected in series. Additionally, when a series connection is used, the cabinet wiring will replace a removed submodule with a short, allowing the other submodules to remain in the circuit. In this manner, the PCS will be able to detect, and charge and discharge the remaining submodules. As a result, it may be possible to safely perform the live installation and removal of submodules.

Certain embodiments of capacitor-based electrical energy storage submodules, modules, and systems of the present invention have been described in detail above for purposes of illustration. It is to be understood, however, that a multitude of variations are possible. For example, the size, shape, and capacity of the modules may vary, depending on the size and storage capacity of the submodules and the desired power output of the module. Different cabinet styles and racking systems may also be used. The modularity of afforded by the design of the present invention allows for a many different combinations and configurations to be explored. In addition, networks of large numbers of various modules scattered over many sites is possible, thereby creating virtual large-scale energy storage. As such, while certain embodiments of the present invention are described in detail above, the scope of the invention is not to be considered limited by such disclosure, and modifications are possible without departing from the spirit of the invention as evidenced by the following claims.

What is claimed is:

1. A capacitor-based electrical energy storage module, comprising:
   at least one interchangeable capacitor-containing submodule;
   at least one enclosure for receiving and housing said at least one submodule;
   means for providing electrical communication between submodules when more than one submodule is located within an enclosure; and
   power conversion means for controlling the charging and discharging of said at least one submodule;
   wherein said module is adapted to receive and output electric power, and convert and store electrical energy.

2. The capacitor-based electrical energy storage module of claim 1, further comprising control and communication means for monitoring and controlling the operation of each module.

3. The capacitor-based electrical energy storage module of claim 1, wherein said monitoring and controlling is done remotely.

4. The capacitor-based electrical energy storage module of claim 1, wherein a plurality of enclosures, each containing at least one submodule, may be connected to provide a larger module of greater power output.

5. The capacitor-based electrical energy storage module of claim 1, wherein electric power output therefrom is of the DC variety.

6. The capacitor-based electrical energy storage module of claim 1, wherein electric power output therefrom is of the AC variety.

7. A system for creating a capacitor-based electrical energy storage module, comprising:
- at least one interchangeable capacitor-containing submodule of predetermined electrical energy storage capacity;
- at least one enclosure for receiving and housing said at least one submodule;
- means for providing electrical communication between submodules when more than one submodule is located within a single enclosure; and
- power conversion means for controlling the charging and discharging of said at least one submodule;
- wherein said module is adapted to receive and output electric power, and convert and store electrical energy; and
- wherein any number of said enclosures, each containing at least one submodule, may be interconnected to provide a module of desired power output.

8. The system of claim 7, further comprising control and communication means for monitoring and controlling the operation of each module.

9. The system of claim 8, wherein said monitoring and controlling is done remotely.

10. The system of claim 7, wherein electric power output therefrom is of the DC variety.

11. The system of claim 7, wherein electric power output therefrom is of the AC variety.

12. A method of forming a capacitor-based electrical energy storage module, comprising:
- providing one or more interchangeable capacitor-containing submodules;
- providing at least one enclosure adapted to receive one or more of said submodules;
- providing for electrical communication between submodules when more than one submodule is installed to an enclosure;
- supplying a power conversion means for controlling the charging and discharging of said one or more submodules;
- wherein said module is adapted to receive and output electric power, and convert and store electrical energy; and
- wherein multiple enclosures each having one or more submodules installed thereto can be electrically interconnected to provide for a module of greater storage capacity.

13. The method of claim 12, further comprising supplying a control and communication means for monitoring and controlling the operation of said module.

14. The method of claim 13, wherein said monitoring and controlling is done remotely.

15. The method of claim 12, wherein a power conversion means is associated with each enclosure of a multiple-enclosure module.

* * * * *